3,222,132
STEAM REFORMING OF HYDROCARBONS
Dennis Albert Dowden, Norton-on-Tees, England, assignor to Imperial Chemical Industries Limited, London, England, a corporation of Great Britain
No Drawing. Filed Sept. 6, 1962, Ser. No. 221,903
Claims priority, application Great Britain, Nov. 6, 1961, 39,607/61; May 17, 1962, 19,097/62
4 Claims. (Cl. 23—212)

This invention relates to hydrocarbon steam reforming processes and the products thereof.

The invention provides a process of steam reforming hydrocarbons boiling at temperatures up to 350° C., preferably normally liquid hydrocarbons boiling in the range 30° to 200° C. to yield mixed gases containing hydrogen and carbon monoxide which comprises reacting the hydrocarbons with steam at an elevated temperature in the presence of a catalytic composition containing a platinum group metal, other than rhodium, present as the metal or as a compound of the metal reducible thereto and a refractory inorganic oxidic material.

The platinum group metal for use in this invention may be ruthenium, rhodium, osmium, iridium or platinum and mixtures of such metals and/or their compounds may be used.

The platinum group metal may be present in the catalytic composition in amounts between 0.01% and 20% calculated on the weight of the metal and based on the weight of the composition after calcination at 900° C. Preferably the platinum group metal is present in amounts between 0.01% to 5.0% by weight and more preferably between 0.1 and 2.5% by weight.

The platinum group metal may be incorporated into the inorganic oxidic material in a number of ways. Conveniently the refractory inorganic oxidic material is impregnated with the metal or a reducible compound thereof, for example by immersing refractory material shapes in a solution of a salt of the metal. In another method the platinum group metal may be introduced into the catalytic composition during its prepartion, e.g. by admixture of the refractory material with the metal or a reducible compound thereof and then forming the desired shapes.

Alumina, in particular gamma alumina is a very suitable refractory inorganic oxidio material; alpha alumina, beta alumina, magnesium oxide and zirconia may also be used. A gamma alumina suitable for use in this invention may be prepared in accordance with co-pending British application No. 32,491/61. If the platinum group metal is present as a compound, then the compound may be converted to the metal by, for example, heating in a current of hydrogen before or during use of the catalyst composition in a steam forming process.

In accordance with co-pending U.S. application Serial No. 114,304 in order to reduce the amount of carbon deposited on the catalyst composition when used in a steam reforming process it is advantageous to have present in the composition an alkali or alkaline earth metal compound conveniently in an amount equivalent to 0.5%–11% by weight of potassium oxide present in the composition following calcination at 900° C. Conveniently the alkali or alkaline earth metal compound is the oxide or a compound which is capable of being decomposed to the oxide for example in the steam reforming process and/or which is alkaline in aqueous solution. The hydroxides and carbonates are preferred, but the nitrates and bicarbonates may also be used. Potassium and sodium are suitable alkali metals. The alkali or alkaline earth metal compound may be incorporated with the catalyst composition in a number of different ways and at various stages in its preparation. Conveniently the alkali or alkaline earth metal compound may be introduced in the preparation of the gamma alumina component of the catalyst. In another method the catalyst composition is impregnated with the alkali or alkaline earth metal compound for example by immersing the catalyst composition in a solution of the compound.

It is preferred that the alkali metal or alkaline earth metal compound is present in amount equivalent to at least 1% by weight of potassium oxide if the catalyst composition contains up to 5% by weight of silica and at least 3% thereof if it contains at least 10% by silica with corresponding amounts if other amounts of silica are present.

The catalyst shapes may be any of the common forms; pieces, powders, pellets are the strongest mechanically but rings give a lower pressure drop in steam reforming processes.

The preferred application of this process is to substantially saturate hydrocarbons, but it may also be applied to saturated hydrocarbons containing a minor amount i.e. up to 50%, preferably up to 20%, of unsaturated or aromatic hydrocarbons. The process is particularly useful, for steam reforming normally liquid hydrocarbons. Thus, a straight run petroleum distillate boiling in the range 30°–220° C. may be used, or even up to 270° C. Liquefied petroleum gases and natural gases may also be used as the feedstock. The product may contain besides CO and $H_2$ up to 38%, for example 8% to 20% by volume of $CO_2$.

The temperature may conveniently be in the range 550°–1100° C., preferably 700–800° C. The pressure may be for instance between 1 and 50 atmospheres absolute, preferably 1 to 20 atmospheres.

The appropriate operating temperature is dependent on the pressure used and on the composition of the desired product gas. In general, to produce gases having a high proportion of $H_2$ and CO, a temperature of 700°–800° C. is convenient.

The steam ratio may, for example, be between 1.5 and 6 and is conveniently between 2 and 5 and at steam ratios below about 5 it is preferred to have an alkali metal or an alkaline earth metal compound present in the catalytic composition to reduce carbon formation. By the term steam ratio is meant the number of molecules of steam per atom of carbon in the reactant hydrocarbon.

The invention may also be applied to the production of methane containing gases from non-methane feedstocks by operating under the conditions described above, except that temperatures in the range 550–750° C. and pressures above 100 p.s.i.g. and low steam ratios such as 1.5 to 4, particularly 2 to 3, are used while the space velocity is kept sufficiently low to convert substantially all of the feedstock.

It is preferred that the feedstock to be reformed with steam be substantially free from sulphur, i.e. contain at the most 10 p.p.m. by weight although it may usefully contain between 1 and 5 p.p.m. thereof to reduce the tendency to carbon formation. However the catalyst compositions used in this invention, in particular those containing palladium and platinum, have a useful degree of sulphur tolerance, and it is possible to conduct steam reforming with them on feedstocks containing for example between 10 p.p.m. and 500 p.p.m. of sulphur by weight but at somewhat reduced efficiencies as evidenced by lower gas makes. Moreover these catalyst compositions have the advantage that the fall in efficiency is not permanent, for when sulphur-containing feedstock was replaced by desulphurised material the activity was restored to normal.

EXAMPLE 1

The catalyst composition was prepared either by: (a) impregnation of gamma-alumina in the form of $\frac{3}{16}''$ pellets with platinum by immersion in a solution of platinum chloride, followed by heating in a current of hydrogen at a temperature around 300° C. to decompose the platinum chloride to the metal; or (b) mixing powdered gamma-alumina and an aqueous solution of chloroplatinic acid in the desired proportions, drying at 110° C., compressing the mixture to give $\frac{3}{16}''$ pellets, and thereafter heating to 600° C. to decompose the platinum compound to the metal.

Liquid hydrocarbons substantially free from olefinic and acetylenic unsaturation and from sulphur, and boiling at 40° C. to 156° C. were steam reformed at steam ratios of 2 to 5 in the presence of the platinum/alumina catalytic compositions containing varying amounts of platinum, as prepared above and under the reaction conditions specified below:

Outlet pressure _____ p.s.i.g__ 180
Bulk catalyst volume _____ mls__ 50
Liquid hydrocarbon feed rate _____ ml./hr__ 40

The activity of the catalyst compositions as given in this and subsequent tables is measured in a separate experiment as the percentage of methane gas converted at a steam ratio of 3 at 180 p.s.i. gauge and 750° C., with the methane passing at a rate of 100 l. per hour over a 50 ml. bed of catalyst. The methane conversion is defined as:

$$\frac{\text{Inlet methane rate} - \% \text{ methane or exit gas} \times \text{exit gas rate}}{\text{Inlet methane rate}}$$

| Catalyst Percent Pt | Activity (methane conversion percent) | Steam ratio | Composition of product gas: volume percent ||||| 
|---|---|---|---|---|---|---|---|
| | | | $H_2$ | CO | $CO_2$ | $C_nH_{2n+2}$ [2] | Undetermined |
| Catalyst made by impregnation (Preparation as (a) above) |||||||| 
| 2 | 36.0 | 5 | 57.0 | 6.4 | 14.2 | 18.5 | 3.9 |
| 2 | 36.0 | 3 | 57.5 | 9.0 | 15.0 | 17.0 | 1.5 |
| 2 | 36.0 | 2 | 56.0 | 9.0 | 14.0 | 14.6 | 6.4 |
| 1 | 48.8 | 5 | 52.8 | 10.0 | 13.6 | 21.0 | 2.6 |
| 1 | 48.8 | 4 | 58.1 | 6.3 | 18.0 | 15.6 | 2.0 |
| 1 | 48.8 | [1] 3 | 60.3 | 6.2 | 18.2 | 13.6 | 1.7 |
| 0.5 | 39.4 | 5 | 51.9 | 8.1 | 11.8 | 22.6 | 5.6 |
| 0.5 | 39.4 | 4 | 44.2 | 7.2 | 12.2 | 25.0 | 11.4 |
| 0.5 | 39.4 | [1] 3 | 55.7 | 7.8 | 14.5 | 17.4 | 4.6 |
| Catalyst in which Pt introduced prior to pelleting (Preparation as (b) above) |||||||| 
| 2 | 61.1 | 5 | 61.2 | 6.0 | 17.4 | 11.8 | 3.6 |
| 2 | 61.1 | 4 | 54.0 | 7.0 | 16.4 | 14.3 | 8.3 |
| 2 | 61.1 | 3 | 40.6 | 7.2 | 13.6 | 26.6 | 12.0 |
| 2 | 61.1 | 2 | 51.2 | 12.2 | 12.0 | 18.8 | 5.8 |

[1] Indication of carbon lay-down commencing.
[2] Predominantly methane.

EXAMPLE 2

The catalytic compositions were made by the methods described above for the platinum/alumina catalytic compositions except that a palladium salt, palladium nitrate was used instead of platinum chloride.

A series of experimental runs similar to and under the same conditions as those described above for the platinum/alumina catalytic compositions was conducted with the palladium/alumina catalytic compositions containing varying amounts of palladium, and the results obtained are given in the table below.

| Catalyst percent Pd | Activity (methane conversion percent) | Steam ratio | Composition of product gas: volume percent |||||
|---|---|---|---|---|---|---|---|
| | | | $H_2$ | CO | $CO_2$ | $C_nH_{2n+2}$ [1] | Undetermined |
| Catalyst made by impregnation |||||||| 
| 2 | 47.2 | 5 | 61.4 | 9.6 | 15.8 | 11.4 | 1.8 |
| 2 | 47.2 | 4 | 61.0 | 4.8 | 14.5 | 9.8 | 9.9 |
| 2 | 47.2 | 3 | 59.6 | 10.0 | 16.0 | 12.2 | 2.2 |
| 2 | 47.2 | [2] 2.5 | 60.2 | 9.0 | 16.0 | 13.4 | 1.4 |
| 1 | 30.0 | 5 | 64.2 | 7.0 | 17.0 | 9.4 | 2.6 |
| 1 | 30.0 | 4 | 56.8 | 7.6 | 16.3 | 12.4 | 6.9 |
| 1 | 30.0 | 3 | 56.0 | 8.0 | 15.8 | 17.6 | 2.6 |
| 1 | 30.0 | 2.5 | 53.2 | 9.4 | 14.0 | 16.2 | 7.2 |
| 1 | 30.0 | 2 | 55.6 | 10.0 | 14.8 | 17.4 | 2.2 |
| 0.5 | 21.2 | 5 | 61.7 | 8.4 | 16.8 | 10.1 | 3.0 |
| 0.5 | 21.2 | 4 | 64.1 | 10.3 | 15.2 | 6.3 | 4.1 |
| 0.5 | 21.2 | 3 | 56.0 | 11.8 | 14.5 | 15.7 | 2.0 |
| 0.5 | 21.2 | [2] 2 | 41.6 | 14.2 | 8.2 | 33.0 | 3.0 |

[1] Predominantly methane.
[2] There was evidence of lay-down of carbon on the catalyst.

EXAMPLE 3

The purpose of this example is to illustrate that the catalytic compositions of the invention as exemplified by the platinum/alumina and palladium/alumina catalytic compositions of Examples 1 and 2 respectively shows sulphur tolerance.

A series of experimental runs in which light distillate doped with different amounts of sulphur was passed at a rate of 40 ml. per hour and at a steam ratio of 3 over a 40 ml. bed of the various catalyst compositions. The temperature was maintained at 750° C. Each of the three platinum/alumina catalytic compositions was tested with sulphur free light distillate and then light distillate containing respectively 0, 25, 50, 100 and 200 p.p.m. sulphur. The results are presented in Table 1 below. On changing the feeds the catalyst was activated by alternatively passing steam and hydrogen for a period of at least 2 hours. In the case of the 1% platinum/alumina catalytic composition the sulphur level in the feed was increased and decreased in consecutive experiments in an attempt to detect any permanent loss of activity. Two palladium/alumina catalytic compositions were tested with sulphur free light distillate and then light distillate containing 100 and 200 p.p.m. sulphur. The results are shown in Table II below.

*Table I*

| Catalyst Composition | Sulphur content p.p.m. | Gas rate l./hr. | Mean gas analysis | | | | |
|---|---|---|---|---|---|---|---|
| | | | $H_2$ | CO | $CO_2$ | $C_nH_{2n+2}$ | Unsat. |
| 2% impregnated platinum/ alumina | Nil | 34.6 | 58.3 | 11.6 | 9.1 | 10.2 | 10.2 |
| Do | 10 | 26.1 | 52.7 | 8.2 | 9.3 | 13.6 | 15.8 |
| Do | 25 | 23.2 | 54.2 | 11.7 | 6.4 | 14.2 | 13.5 |
| Do | 50 | 21.7 | 43.5 | 9.6 | 3.8 | 19.7 | 21.6 |
| Do | 100 | 21.9 | 45.8 | 7.3 | 5.1 | 21.7 | 19.1 |
| Do | 200 | 17.7 | 42.7 | 4.9 | 4.6 | 20.1 | 27.2 |
| 1% impregnated platinum/ alumina | Nil | 31.0 | 61.8 | 11.8 | 12.6 | 7.6 | 6.2 |
| Do | 10 | 24.0 | 53.6 | 9.0 | 10.0 | 11.8 | 15.6 |
| Do | 25 | 18.7 | 51.8 | 8.6 | 9.6 | 13.2 | 16.8 |
| Do | 50 | 34.0 | 61.8 | 13.6 | 10.2 | 8.6 | 5.8 |
| Do | 100 | 23.3 | 49.4 | 7.4 | 8.2 | 15.6 | 19.4 |
| Do | 200 | 23.5 | 59.4 | 14.0 | 9.4 | 10.0 | 7.0 |
| Do | 25 | 33.6 | 58.4 | 11.6 | 10.8 | 9.8 | 9.4 |
| Do | 10 | 60.7 | 65.7 | 18.2 | 9.8 | 4.3 | 1.8 |
| Do | Nil | 48.0 | 61.8 | 16.8 | 10.0 | 7.4 | 4.0 |
| 0.5% impregnated platinum/ alumina | Nil | 44.5 | 68.3 | 11.4 | 12.9 | 5.0 | 2.1 |
| Do | 10 | 21.2 | 47.6 | 15.0 | 3.3 | 16.8 | 16.8 |
| Do | 25 | 23.5 | 49.3 | 12.4 | 3.9 | 15.7 | 18.3 |
| Do | 50 | 20.0 | 41.9 | 7.7 | 3.7 | 21.5 | 24.9 |
| Do | 100 | 13.4 | 38.7 | 6.7 | 4.4 | 23.3 | 26.9 |
| Do | 200 | 19.6 | 39.6 | 4.4 | 4.2 | 22.9 | 28.7 |

*Table II*

| Catalyst Composition | Sulphur content p.p.m. | Gas rate l./hr. | Mean gas analysis | | | | |
|---|---|---|---|---|---|---|---|
| | | | $H_2$ | CO | $CO_2$ | $C_nH_{2n+2}$ | Unsat. |
| 2% palladium/alumina (palleted) | 0 | 66.2 | 67.2 | 17.2 | 11.0 | 3.8 | 11.0 |
| Do | 100 | 24.8 | 46.2 | 7.0 | 4.8 | 15.8 | 26.2 |
| Do | 200 | 15.9 | 47.2 | 7.0 | 6.6 | 18.0 | 21.2 |
| 0.5% palladium/alumina (pelleted) | 0 | 37.3 | 57.1 | 15.0 | 9.4 | 12.1 | 6.2 |
| Do | 100 | 19.9 | 47.3 | 8.9 | 6.7 | 19.3 | 17.7 |
| Do | 200 | 12.3 | 48.3 | 13.2 | 7.7 | 15.6 | 15.1 |

The increase in gas make and improvement in gas composition consequent on decreasing the sulphur level of the light distillate feed, passing over the 1% platinum/alumina catalytic composition, from 200 p.p.m. to nil indicates that there is no permanent loss in the catalytic activity when operating with a high sulphur feed.

EXAMPLE 4

Powdered gamma alumina was thoroughly mixed with a 2% solution of palladium chloride and a ½% solution of potassium hydroxide and the mixture compressed to give 3/16″ pellets. The pellets were dried at 120° C. and then heated to 400° C. to decompose the palladium salt to the metal. The activity of the catalytic composition, measured by the process, involving the steam reforming of methane, which was described in Example 1 above, was 42.3. The activity of the corresponding platinum/alumina catalytic composition was found to be 50.5.

I claim:
1. A continuous process of steam reforming normally liquid hydrocarbons boiling at temperatures up to 350° C. which comprises reacting the hydrocarbon with steam at a temperature in the range of 550° to 1100° C. and a pressure in the range 1 to 50 atmospheres in the presence of a catalytic composition consisting essentially of a gamma alumina refractory inorganic oxidic material and an active constituent selected from the group consisting of ruthenium, palladium, osmium, iridium and platinum and compounds thereof, the said active constituent being present in an amount between 0.01 and 20% calculated as the weight of metal and based on the weight of the composition after calcination at 900° C.

2. A process according to claim 1 in which the feedstock contains between 10 and 500 p.p.m. of sulphur.

3. A continuous process of steam reforming normally liquid hydrocarbon feedstocks boiling within the range of about 30 to about 270° C. which comprises reacting the hydrocarbon feedstock with steam at a temperature within the range of about 700 to 800° C. and a pressure within the range of about 1 to about 20 atmospheres in the presence of a catalytic composition consisting essentially of gamma alumina, from about 0.5 to about 11% of an alkali metal compound, and an active constituent selected from the group consisting of ruthenium, palladium, osmium, iridium and platinum, the said active constituent being present in an amount between about 0.1 and about 2.5%, based on the weight of said active constituent in the catalyst composition after calcination at 900° C., the steam ratio lying between about 2 and about 5 moles of steam per atom of carbon in the hydrocarbon feedstock.

4. A continuous process of steam reforming normally liquid hydrocarbons boiling at temperatures up to 350° C. which comprises reacting the hydrocarbon with about 1.5 to 6 moles of steam per atom of carbon in the feedstock at a temperature in the range 550° to 1100° C. and a pressure in the range 1 to 50 atmospheres in the presence of a catalytic composition consisting essentially of a gamma alumina refractory inorganic oxidic material and an active constituent selected from the group consisting of ruthenium, palladium, osmium iridium and platinum and compounds thereof, the said active constituent being present in an amount between about 0.1% and 2.5% calculated as the weight of metal and based on the weight of the composition after calcination at 900° C.

References Cited by the Examiner

UNITED STATES PATENTS

| | | | |
|---|---|---|---|
| 2,030,283 | 2/1936 | De Rewal | 23—212 |
| 2,783,133 | 2/1957 | Eastwood | 23—212 |
| 2,793,938 | 5/1957 | Frank | 23—212 |
| 2,971,037 | 2/1961 | Gilbert et al. | 352—442 |
| 2,999,074 | 9/1961 | Bloch et al. | 252—442 |
| 3,022,252 | 2/1962 | Guyer et al. | 252—442 |
| 3,031,286 | 4/1962 | Bartholome et al. | 23—212 X |
| 3,102,864 | 9/1963 | Binning et al. | 252—442 |

BENJAMIN HENKIN, *Primary Examiner.*

MAURICE A. BRINDISI, *Examiner.*